United States Patent Office 2,950,265
Patented Aug. 23, 1960

2,950,265

COMPOSITION CONTAINING VINYL POLYMER AND A BICYCLOHEPTENE DICARBOXYLIC ACID-GLYCOL POLYESTER AND PROCESS FOR MAKING THE POLYESTER

John R. Caldwell and John W. Tamblyn, Kingsport, Tenn., assignors to Eastman Kodak Company, Rochester, N.Y., a corporation of New Jersey No Drawing. Filed Feb. 6, 1957, Ser. No. 638,441

9 Claims. (Cl. 260—31.6)

This invention relates to plastic compositions composed of vinyl resins or of cellulose esters which are stabilized against degradation during exposure to heat. More particularly this invention concerns the use of polymeric esters of bicyclo-(2.2.1)-5-heptene-2,3-dicarboxylic acid with certain glycols.

Plastic materials such as the vinyl polymers and cellulose esters are subject to various types of thermal degradations caused by traces of mineral acids, present either as initial impurities or generated in the plastic during exposure to heat. In the cellulose esters, this degradation takes the form of molecular-weight breakdown with consequent loss of strength and toughness. In the polyvinyl plastics such as polyvinyl chloride, degradation takes the form of discoloration.

In the past various types of acid absorbers have been used to produce stabilization of these plastics against the damaging effects of heat. For instance, alkaline inorganic pigments like magnesium carbonate or organic acid absorbers such as the epoxy compounds have been widely used for this purpose. The organic absorbers have been considered more effective than the inorganic absorbers. However, for general use, particularly for films and fibers, a stabilizer which has less tendency to escape from the plastic by evaporation or leaching is desirable for maximum permanence of stabilizing action. We have found that certain polymeric derivatives containing the bicycloheptene structure satisfies this need. These derivatives are low-molecular-weight polyesters made by condensing bicyclo-(2.2.1)-5-heptene-2,3-dicarboxylic acid with certain glycols.

One object of this invention is to provide a plastic material from cellulose esters or polyvinyl materials stabilized against degradation from exposure to heat. Another object of this invention is to provide a process for stabilizing cellulose esters and polyvinyl chloride plastic compositions against deterioration at elevated temperatures. An additional object is to provide a material which may be used for stabilizing organic plastic materials against heat degradation. A further object is to provide a low-molecular-weight polyester from bicyclo-(2.2.1)-5-heptene-2,3-dicarboxylic acid.

To prepare the polymeric composition which we have found extremely suitable for stabilizing plastic materials against heat, three molecular proportions of bicyclo-(2.2.1)-5-heptene-2,3-dicarboxylic anhydride and four molecular proportions of ethylene glycol are heated at 180° C. for two hours in a nitrogen atmosphere. The temperature is then raised to 220° C. and held for three hours. The product is a viscous syrup having a molecular weight of 600–700 that was soluble in the common solvents such as acetone, alcohol, and methylene chloride. Butenediol-1,4, propylene glycol and butylene glycol may be used in place of ethylene glycol.

The low-molecular-weight polyesters used in the process of the invention may be prepared by using a ratio of 2–5 molecular proportions of bicyclo-(2.2.1)-5-heptene-2,3-dicarboxylic acid, or suitable derivative, with 3–6 molecular proportions of the glycol. The acid may be used in the form of its anhydride or lower alkyl ester. When the polymer is made with butenediol, it is preferred to use a lower alkyl ester of the acid, and an ester interchange catalyst such as titanium butoxide, litharge, or calcium oxide.

The reaction is preferably carried out in two stages. In the first stage the reactants are heated at 140–180° C. for 2–4 hours and in the second stage at 200–220° C. for 2–4 hours.

The polyesters have a molecular weight in the range of 500–1800.

The following examples are intended to illustrate our invention but are not intended to limit it in any way:

EXAMPLE 1

Polyvinyl chloride (Geon 101) was roll-compounded with 30% by weight of dioctyl phthalate and sheeted off the roll in the form of slabs 75 mils thick. Similar compoundings were prepared containing, in addition, 4% by weight of the short-chain length polyester made from bicyclo-(2.2.1)-5-heptene-2,3-dicarboxylic acid and ethylene glycol or 4% by weight of the short-chain length polyester made from the same diacid and butenediol. Samples of these compoundings were heated between glass plates in an air oven, and observed from time to time to follow the progress of discoloration. The oven temperature was about 130° C. at the start and was set to rise at the rate of about 30° C. per hour. The results, given in Table I, show that the bicycloheptene polyesters, particularly that made with the unsaturated glycol, produced a substantial improvement in the resistance of polyvinyl chloride plastic to discoloration by heat.

*Table I*

| Stabilizer | Color of Sample After Heating | | | |
|---|---|---|---|---|
| | 30 Min. | 60 Min. | 90 Min. | 110 Min. |
| None | light brown. | brown | dark brown. | black. |
| Bicycloheptene polyester with ethylene glycol. | light orange. | orange | red | dark red. |
| Bicycloheptene polyester with butenediol. | ---do--- | light orange. | reddish orange. | reddish brown. |

EXAMPLE 2

Cellulose acetate butyrate (13% acetyl, 38% butyryl) was roll-compounded with 12% by weight of dibutyl sebacate and sheeted off the roll in the form of slabs 75 mils thick. Similar compoundings were prepared containing, in addition, 1% by weight of the ethylene glycol or butenediol polyester of Example 1. Samples of these compoundings were heated between glass plates in an air oven, and observed from time to time to follow the progress of discoloration. The oven temperature was about 180° C. at the start and was set to rise at the rate of about 25° C. per hour. The results, given in Table II, show that the bicycloheptene polyesters produced a substantial improvement in the resistance of cellulose acetate butyrate plastic to discoloration by heat.

*Table II*

| Stabilizer | Color of Sample After Heating | | | |
|---|---|---|---|---|
| | 50 Min. | 105 Min. | 140 Min. | 170 Min. |
| None | colorless | yellow | yellow-brown. | brown. |
| Bicycloheptene polyester with ethylene glycol. | ---do--- | light yellow. | light yellow. | light yellow. |
| Bicycloheptene polyester with butenediol. | ---do--- | ---do--- | ---do--- | Do. |

Samples of these same compositions were heated for half an hour at 250° C. and the degradation of the cellulose acetate butyrate determined by measurement of the inherent viscosity, $\{\eta\}$ before and after heating. $\{\eta\}$ was defined as:

$$\frac{ln\eta_r}{c}$$

where $\eta_r$ is the ratio of the viscosity of solution to that of solvent and $c$ is the concentration of the cellulose acetate butyrate in g. per 100 cc. solvent. The solvent used was acetone, the temperature 25.0° C., and the concentration of the cellulose ester 0.23 g. per 100 cc. acetone. $\{\eta\}$ before heating had the value of 1.40. The breakdown results, recorded in Table III, show a worthwhile improvement produced by addition of the bicycloheptene esters.

The same samples were also heated at 205° C. for one and two hours. The color developed after these heating periods was graded by comparison with a set of color standards. Color before heating was also determined and these color results included in Table III.

Table III

| Stabilizer | $\{\eta\}$ after 0.5 hr. at 250° C. | Original Color | Color After Heating at 205° C. for— | |
|---|---|---|---|---|
| | | | 1 hr. | 2 hr. |
| None | 0.81 | 35 | 60 | 80 |
| Bicycloheptene polyester with ethylene glycol | 0.91 | 35 | 65 | 70 |
| Bicycloheptene polyester with butenediol | 0.90 | 40 | 60 | 65 |

EXAMPLE 3

Compoundings like those of Example 1 were prepared except that where the bicycloheptene polyesters were included 30% by weight of each, instead of 4% by weight, was used. They were thus employed as secondary, stabilizing plasticizers. Heat tests, similar to those of Example 1 gave the results shown in Table IV. Here, again, the samples containing the bicycloheptene polyesters showed much better color stability than the unstabilized plastic. In these tests the polyester made from the saturated glycol appeared somewhat better than that from the unsaturated glycol.

Table IV

| Stabilizing Plasticizer | Color of Sample After Heating | | |
|---|---|---|---|
| | 40 Min. | 70 Min. | 100 Min. |
| None | orange | dark red-brown | black |
| Bicycloheptene polyester with ethylene glycol | light yellow | brown | orange |
| Bicycloheptene polyester with butenediol | do | orange-red | brown |

EXAMPLE 4

Sixteen g. of a copolymer of vinyl chloride and vinyl acetate (Bakelite VYNS), containing 89% vinyl chloride, was dissolved in 100 cc. of methylene chloride to make a dope which was coated and dried to give a film about 6 mils thick. Similar films were made from dopes to which had been added in one case 4 g. of diethyl-bicyclo-(2.2.1)-5-heptene-2,3-dicarboxylate and in the other case 4 g. of the ethylene glycol polyester of Example 1.

Samples of these films were suspended in a mechanical convection oven at 125° C. and observed every two hours for weight loss and development of color. The results, given in Table V, show that the monomeric stabilizer protects the resin well only until it is lost from the film by evaporation. Over 75% of this stabilizer escaped during six hours' heating. The superiority of the polymeric stabilizer is clearly demonstrated for the longer heat treatments. Practically none of this stabilizer escaped during six hours' heating.

Table V
STABILIZATION OF VYNS FILMS

| Stabilizer | Weight Loss (percent) after Heating at 125° C. for— | | | Color after Heating at 125° C. for— | | | | |
|---|---|---|---|---|---|---|---|---|
| | 2 Hr. | 4 Hr. | 6 Hr. | 0 Hr. | 2 Hr. | 4 Hr. | 6 Hr. | 8 Hr. |
| None | 2.90 | 3.06 | 3.11 | None | Light yellow-brown | Yellow-brown | Yellow-brown | Yellow-brown |
| Diethylbicyclo-(2.2.1)-5-heptene-2,3-dicarboxylate | 13.2 | 15.4 | 16.7 | do | None | Light purple | Brownish-purple | Purplish-brown |
| Bicycloheptene polyester with ethylene glycol | 2.16 | 2.36 | 2.51 | do | Very pale straw | Very pale straw | Pale straw | Pale straw |

Cellulose esters which may be stabilized using our new polymeric stabilizer include cellulose acetate, cellulose nitrate, and mixed esters such as cellulose acetate butyrate, cellulose acetate propionate and the like. Vinyl compounds which may be plasticized include vinyl chloride, copolymers of vinyl chloride and vinyl acetate, polystyrene, and the like.

Modifications of the invention other than as described will be apparent to those skilled in the art and the scope of the invention is limited only by the appended claims.

We claim:

1. A composition containing (1) an organic synthetic polymer selected from the group consisting of polyvinyl chloride, copolymers of vinyl chloride and vinyl acetate and polystyrene; and (2) a polyester having a molecular weight of 500–1800 obtained by condensing bicyclo-(2.2.1)-5-heptene-2,3-dicarboxylic acid with a glycol selected from the class consisting of ethylene glycol, propylene glycol, butylene glycol and butenediol.

2. A composition containing (1) an organic synthetic polymer selected from the class consisting of polyvinyl chloride, copolymers of vinyl chloride and vinyl acetate and polystyrene and; (2) a polyester having a molecular weight of 500–1800 obtained by condensing bicyclo-(2.2.1)-5-heptene-2,3-dicarboxylic acid with ethylene glycol.

3. A composition containing (1) an organic synthetic polymer selected from the class consisting of polyvinyl chloride, copolymers of vinyl chloride and vinyl acetate and polystyrene and; (2) a polyester having a molecular weight of 500–1800 obtained by condensing bicyclo-(2.2.1)-5-heptene-2,3-dicarboxylic acid with propylene glycol.

4. A composition containing (1) an organic synthetic polymer selected from the class consisting of polyvinyl chloride, copolymers of vinyl chloride and vinyl acetate and polystyrene and; (2) a polyester having a molecular weight of 500–1800 obtained by condensing bicyclo-(2.2.1)-5-heptene-2,3-dicarboxylic acid with butylene glycol.

5. A composition containing (1) an organic synthetic polymer selected from the class consisting of polyvinyl chloride, copolymers of vinyl chloride and vinyl acetate and polystyrene and; (2) a polyester having a molecular weight of 500–1800 obtained by condensing bicyclo-(2.2.1)-5-heptene-2,3-dicarboxylic acid with butenediol.

6. A composition comprising polyvinyl chloride and a stabilizer, said stabilizer being a polyester having a molecular weight of 500–1800 obtain by condensing bicyclo-(2.2.1)-5-heptene-2,3-dicarboxylic acid with ethylene glycol.

7. A process for the preparation of polyesters of bicyclo-(2.2.1)-5-heptene-2,3-dicarboxylic acid having a molecular weight of 500–1800 comprising condensing three molecular proportions of bicyclo-(2.2.1)-5-heptene-2,3-dicarboxylic anhydride with four molecular proportions of a glycol selected from the class consisting of ethylene glycol, propylene glycol, butylene glycol and butenediol by admixing and heating at 180° C. for two hours in a nitrogen atmosphere, followed by heating for three hours at a temperature of 220° C. in a nitrogen atmosphere.

8. A process for the preparation of polyesters of bicyclo-(2.2.1)-5-heptene-2,3-dicarboxylic acid having a molecular weight of 500–1800 comprising admixing and heating 2–5 molecular proportions of bicyclo-(2.2.1)-5-heptene-2,3-dicarboxylic anhydride with 3–6 molecular proportions of a glycol selected from the class consisting of ethylene glycol, propylene glycol, butylene glycol, and butenediol at 140–180° C. for 2–4 hours in a nitrogen atmosphere.

9. A process for obtaining polyesters of bicyclo-(2.2.1)-5-heptene-2,3-dicarboxylic acid having a molecular weight of 500–1800 comprising admixing three molecular proportions of bicyclo-(2.2.1)-5-heptene-2,3-dicarboxylic anhydride and four molecular proportions of ethylene glycol, heating for two hours at 180° C. in a nitrogen atmosphere, and then heating for a period of three hours at a temperature of 220° C. in a nitrogen atmosphere.

References Cited in the file of this patent

UNITED STATES PATENTS

| 2,311,260 | Staff | Feb. 16, 1943 |
| 2,384,855 | Soday | Sept. 18, 1945 |
| 2,394,815 | Soday | Feb. 12, 1946 |
| 2,766,273 | Bruins et al. | Oct. 9, 1956 |
| 2,794,812 | Phillips et al. | June 4, 1957 |

FOREIGN PATENTS

| 515,865 | Canada | Aug. 23, 1955 |